Jan. 22, 1924.

W. B. CHAPMAN

RECUPERATOR

Filed May 8, 1922

⟶ = Air
⟶⟶ = Waste Gases

William B. Chapman INVENTOR

BY

Prindle, Wright & Vinall ATTORNEYS

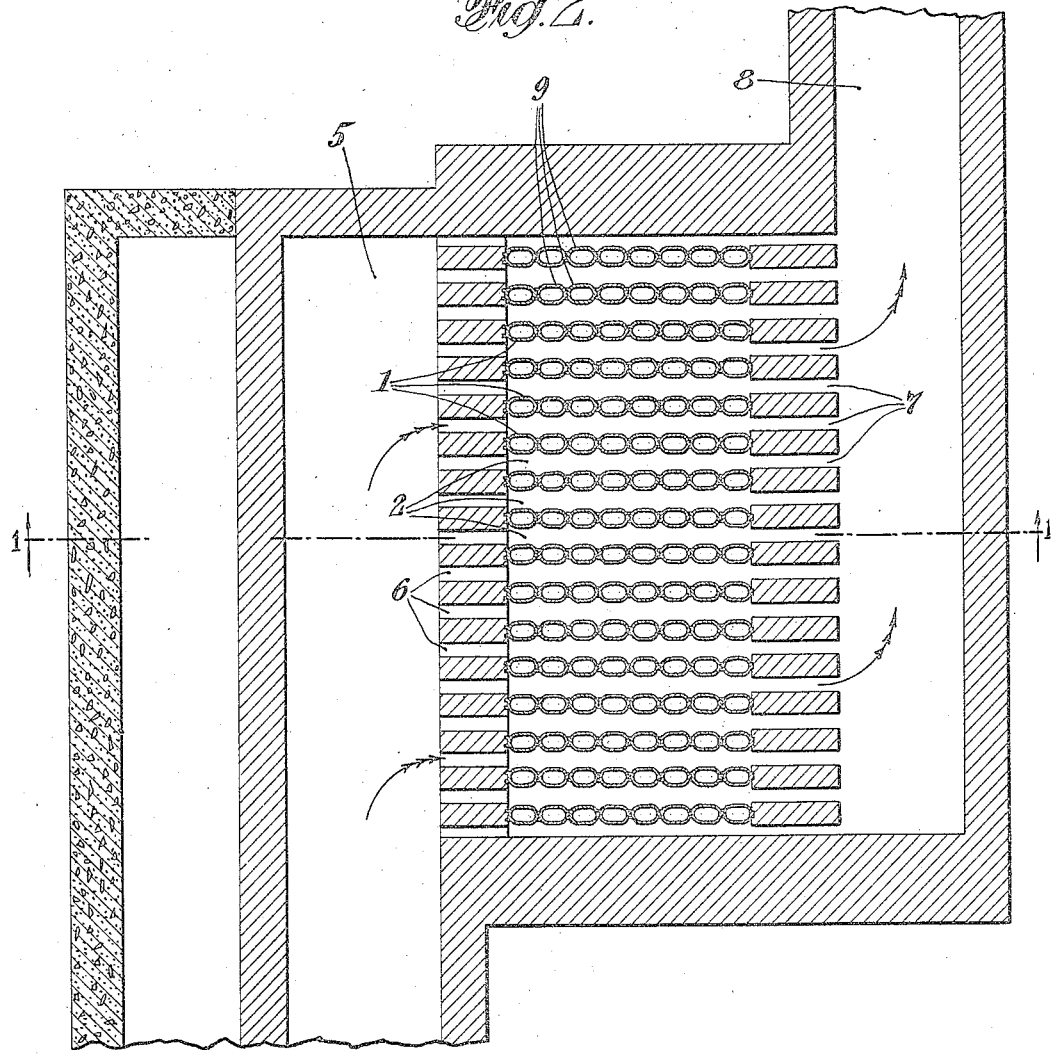

Jan. 22, 1924.
W. B. CHAPMAN
RECUPERATOR
Filed May 8, 1922   5 Sheets-Sheet 3
1,481,348
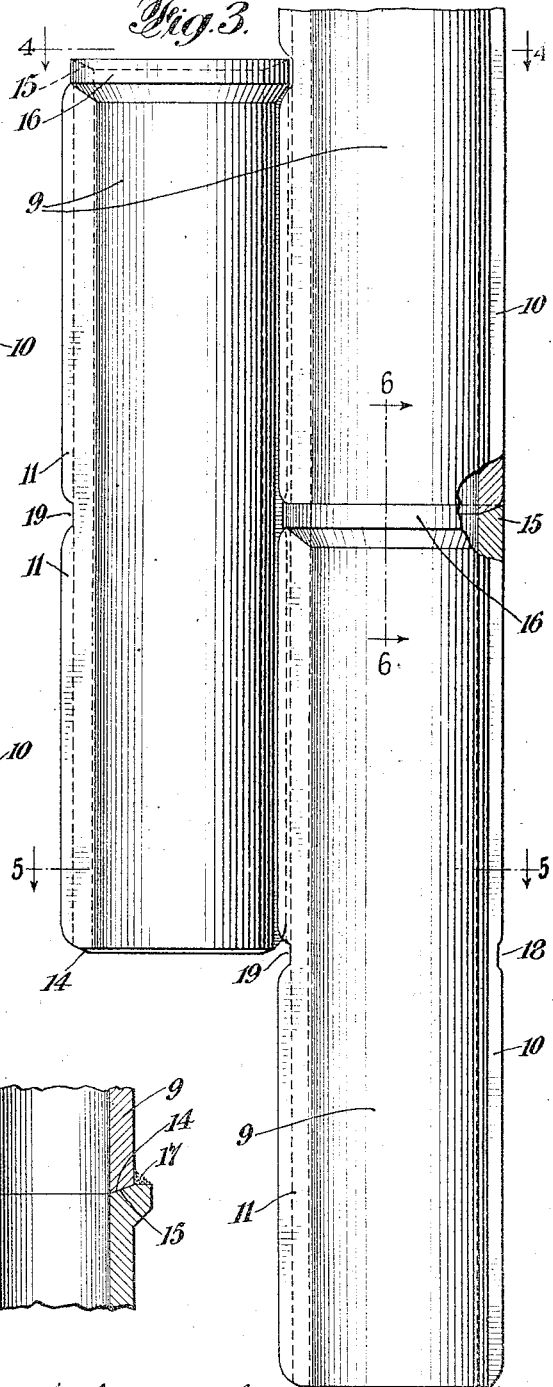
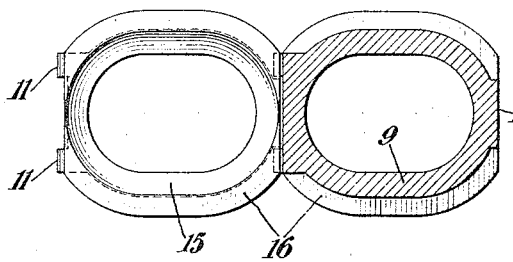
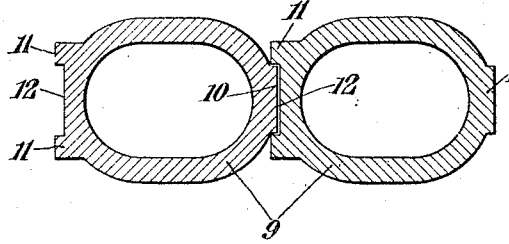
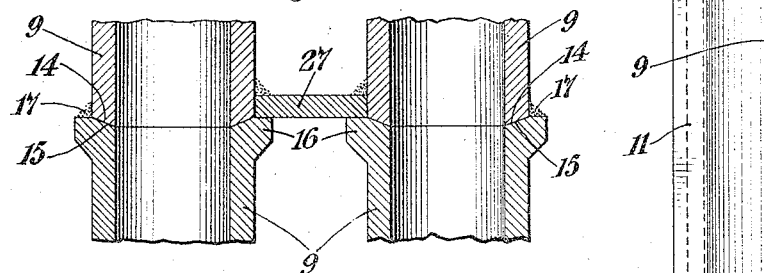
William B Chapman INVENTOR
BY
Purdy, Wright & Small ATTORNEYS Jan. 22, 1924.
W. B. CHAPMAN
RECUPERATOR
Filed May 8, 1922
1,481,348
5 Sheets-Sheet 4
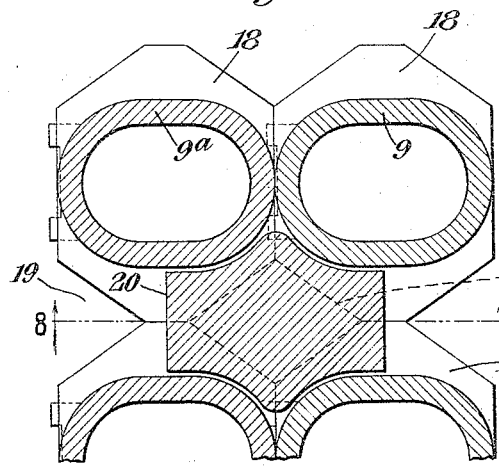
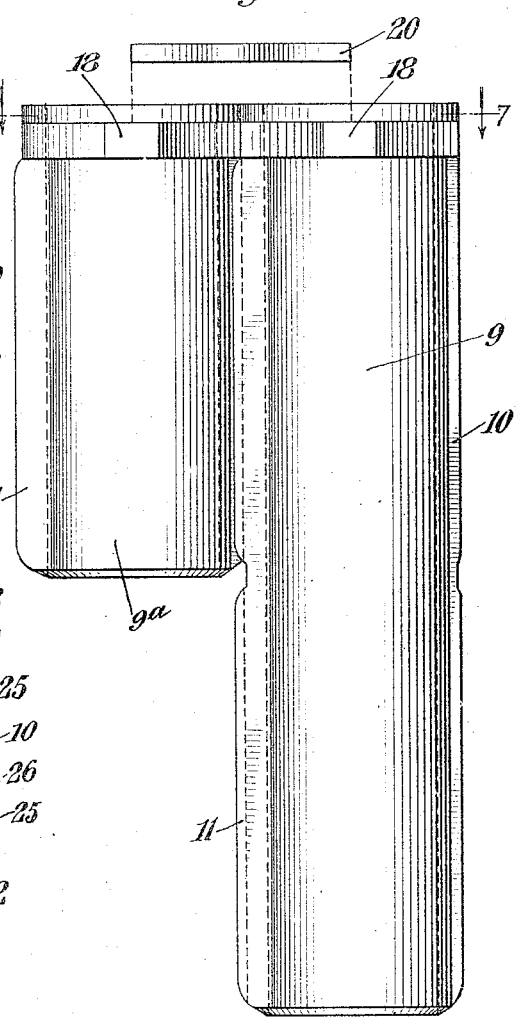
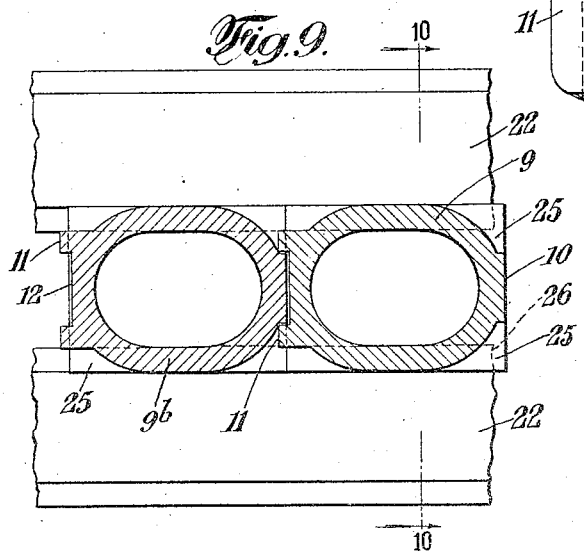
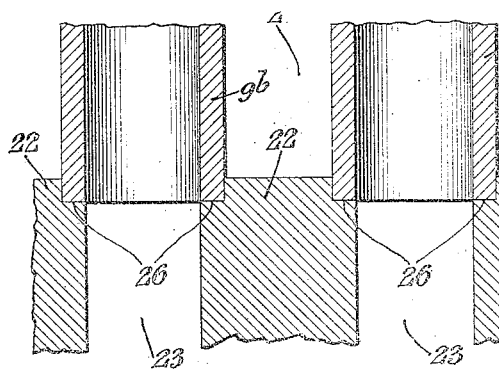

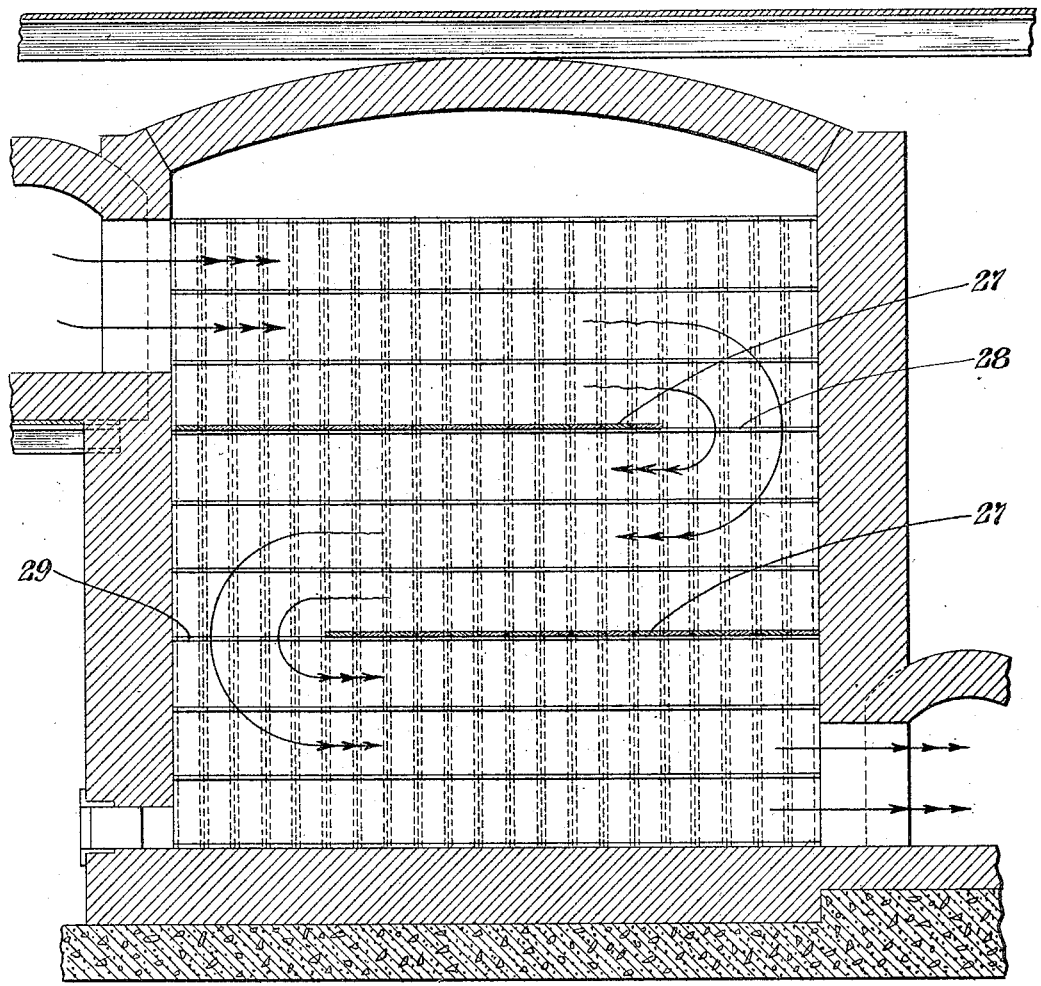

Patented Jan. 22, 1924.

1,481,348

UNITED STATES PATENT OFFICE.

WILLIAM B. CHAPMAN, OF NEW YORK, N. Y., ASSIGNOR TO CHAPMAN-STEIN FURNACE COMPANY, OF MOUNT VERNON, OHIO, A CORPORATION OF OHIO.

RECUPERATOR.

Application filed May 8, 1922. Serial No. 559,184.

*To all whom it may concern:*

Be it known that I, WILLIAM B. CHAPMAN, a citizen of the United States, a resident of New York, in the county of New York and State of New York, have invented a certain new and useful Recuperator, of which the following is a specification.

The invention relates to a recuperator of the type having vertical walls spaced to provide waste gas passages therebetween, and of hollow tile construction to provide upwardly-extending conduits within the respective walls adapted to receive the air or gas to be heated by the heat of the waste gases.

One object of the invention is to so interconnect or interlock the tiles making up the hollow walls above-mentioned, that the necessity will be avoided of providing internal lateral bracing between the walls to hold them in proper position.

Another object is to construct the recuperator in such manner that the waste gases in traveling through the recuperator, need not pass beyond the confines of its hollow walls even under conditions where it is desired to reverse the direction of travel of the waste gases in passing through the recuperator.

The invention also aims to provide tiles of simple and rugged construction which may readily be built up to provide hollow walls of the desired strong and self-sustaining character, which will be adapted to secure efficient heat interchange between the waste gases passing between the walls, and the gas to be heated which passes upwardly through the tiles, which will have the quality of centering themselves properly relative to the recuperator as a whole when being installed or if accidentally displaced in use, as well as to provide certain special tiles and parts associated therewith particularly at the top and bottom of the recuperator, which will facilitate the construction of the recuperator to provide proper passages for the waste gas and the gas to be preheated.

Another object is to provide a recuperator wherein the number of special parts entering into a complete installation will be reduced to a minimum, and wherein the area of heat transfer surface per unit of cost, or per unit of material used will be increased, to the end that the recuperator will be economical both from the standpoint of cost, simplicity of build, and efficiency in operation.

Further objects and advantages of the invention will be in part obvious and in part specifically pointed out in the description hereinafter contained, which, taken in connection with the accompanying drawings, discloses certain preferred embodiments thereof; such embodiments, however, are to be considered merely as illustrative of its principle. In the drawings:

Fig. 2 is a section taken on the broken line 2—2 of Fig. 1, looking in the direction of the arrows.

Fig. 3 is a front elevation illustrating on an enlarged scale the tiles employed in Fig. 1, and the relation in which such tiles are assembled.

Figure 1:
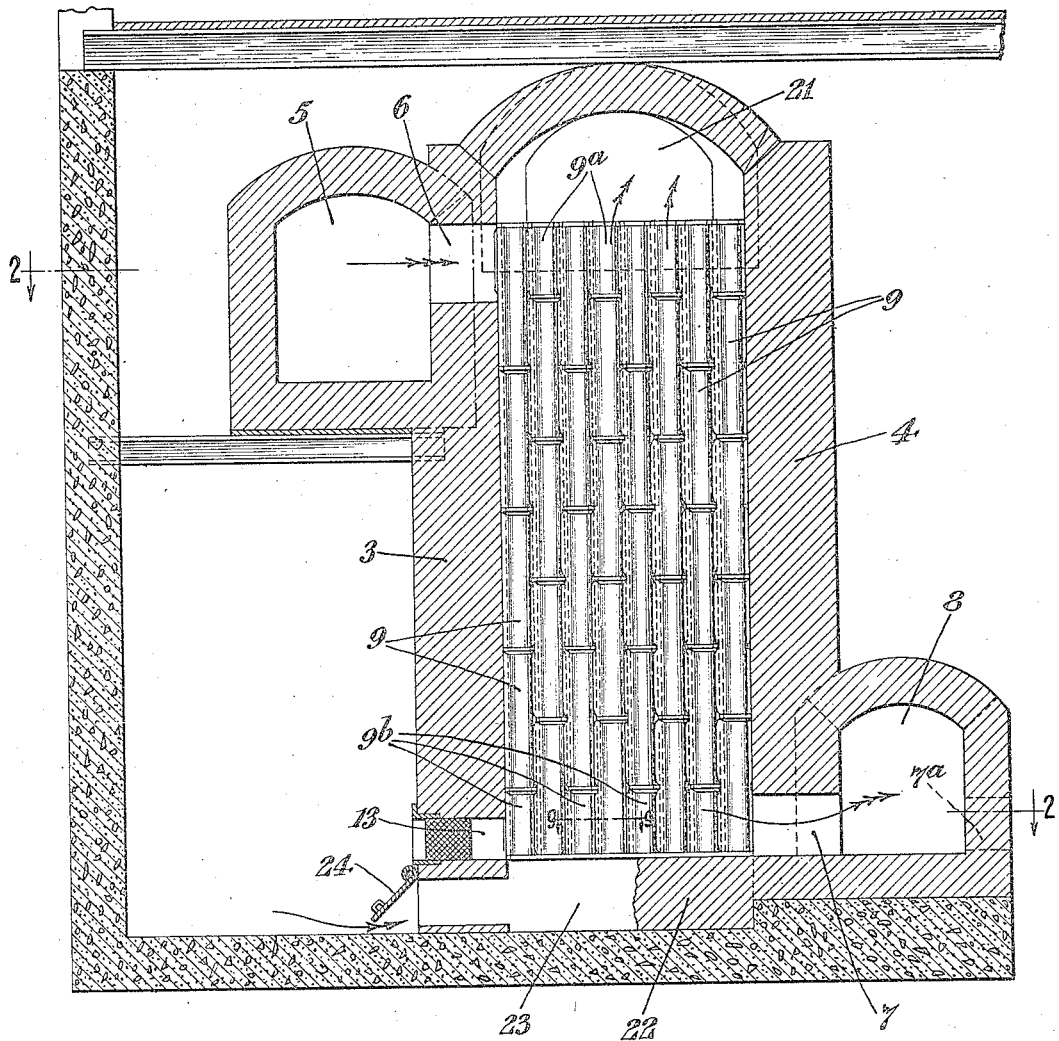
Fig. 1 is a vertical sectional view of a recuperator constructed in accordance with the invention, the section being taken on line 1—1 of Fig. 2, looking in the direction of the arrows.

Figs. 4, 5, and 6 are sectional views taken respectively on line 4—4, 5—5 and 6—6 of Fig. 3.

Fig. 7 is a fragmentary horizontal section illustrating the structure of the tile and associated parts employed at the top of the recuperator, the section being taken on line 7—7 of Fig. 8.

Fig. 8 is a view taken on line 8—8 of Fig. 7, looking in the direction of the arrows.

Fig. 9 is an enlarged fragmentary section taken on line 9—9 of Fig. 1.

Fig. 10 is a fragmentary vertical section of the lower portion of a recuperator taken on line 10—10 of Fig. 9.

Fig. 11 is a view similar to Fig. 1, but showing a recuperator modified to reverse the direction of flow of the waste gases therethrough.

Referring more particularly to Figs. 1 and 2, there is shown a recuperator consisting of a plurality of parallel vertical walls 1 spaced to provide passages 2 therebetween, the ends of the walls 1 being laterally supported or braced for the greater portion of their height by means of retaining walls 3 and 4 (Fig. 1), which serve to retain the walls 1 against endwise loosening or displacement. As shown, the waste gas is conducted to the recuperator through a conduit 5 located adjacent the top of the recuperator and at one side thereof, the waste gas passing from conduit 5 into the upper portions of the several passages 2 above-mentioned, through a plurality of ports 6 in the end wall 3. The waste gas then passes downwardly through passages 2 until it is exhausted adjacent the bottom of the recuperator by means of a plurality of ports 7 in the end wall 4, which lead to an exhaust flue 8. In some instances where a recuperator of large capacity is desired, the exhaust flue 8 may also have further ports 7ª (Fig. 1) leading thereinto from a recuperator structure (not shown), having vertical walls and waste passages similar to those above described.

The walls 1 are of hollow tile construction to provide substantially unrestricted upwardly extending passages therein to receive the air or gas to be heated by the heat of the waste gases passing through passages 2, and in accordance with the present invention, the tiles 9 which make up the walls 1 are interlocked to hold them against lateral shifting relative to each other.

In the present instance, as is shown more in detail in Figs. 3 to 5, the interlocking of tiles 9 is accomplished by means of complementary projections and recesses disposed on the adjacent sides of adjacent tiles, the projections taking the form of ribs 10 disposed along one side of each tile, and shoulders 11 on the opposite sides thereof spaced to provide recesses 12 between the shoulders which are complementary to the ribs 10.

Each of the hollow walls 1 is made up of a plurality of tiles which are so interlocked as to prevent the tiles shifting laterally, and the walls are therefore self-sustaining, whereby no interior bracing members need be employed between adjacent walls 1 to retain such walls, or the tiles constituting the same, in proper position. In the recuperator shown in Figs. 1 and 2 the waste gas passages are therefore wholly unobstructed permitting the gas to pass freely downward to the exhaust flue 8 without encountering obstructions which would tend to increase the suction in the recuperator and cause leakage between the waste gas and the gas to be heated. Furthermore, the elimination of bracing members between adjacent walls 1 simplifies cleaning of the recuperator, since all of the dust or other deposit from the waste gas passing through passages 2, may fall to the bottom of the recuperator, from whence it may be readily removed through a cleaning opening 13 indicated conventionally in Fig. 1. If bracing members are employed, the deposit from the waste gases tends to require the insertion of cleaning tools at all different levels of the waste gas passages, a much more tedious operation, which also may result in injury to the parts of the recuperator.

It is preferred to make up each wall 1 by arranging the tiles therein in adjacent vertical columns, whereby the adjacent sides of such adjacent columns of tiles are interlocked along a line extending substantially from the tops to the bottoms of the walls. In order to further strengthen the walls, it is also preferred to position the tiles so that the tiles of the vertical columns overlap the joints between the tiles of the columns adjacent thereto. This is accomplished in the illustrated embodiment of the invention by providing the columns of tiles (see Fig. 1) with top and bottom tiles 9ª and 9ᵇ respectively which are of less height than the remaining tiles used in making up the hollow walls. Thus the horizontal joints in the walls 1 are staggered or broken up so as to eliminate weak points in the structure.

It is also preferred to construct the joints between the tiles at different levels in the walls, in such manner that the tiles making up each wall tend to center themselves properly with regard to those next above and below. One end of each tile, in the present instance the bottom end, is provided with an outwardly tapering projection 14 (Figs. 3 and 6), while the remaining ends of the tiles are provided with inwardly tapering or recessed portions 15. Thus when the tiles are assembled, they tend to center properly one over the other, or if they are displaced slightly during use the tapering engaging surfaces tend to guide them back to proper position. As shown, the upper ends of the tiles 9 are provided with flanges 16, and the joints between tiles may be cemented if desired to make the same tight, as indicated at 17 (Fig. 6). Ribs 10 and shoulders 11 may be cut away, as indicated respectively at 18 and 19 (Fig. 3) to permit the flange of each tile to fit against the sides of adjacent tiles which overlap the same.

It will be obvious that the invention is not dependent upon any particular shape of tile, but it is preferred to construct the tiles of gradually curved annular cross section as shown, for example, in Figs. 4 and 5, thereby eliminating sharp corners or marked irregularities in shape, which would tend to crack the tiles upon expansion and contraction. Furthermore, as the waste gases flow through the passages 2, they tend to move most rapidly in the central region of the passages, resulting in a loss in efficiency in the heat interchange between the waste gas and the tiles. It is therefore preferred to construct the walls 1 to present irregular surfaces to the waste gas currents, thereby breaking up the latter and bringing them into closer and longer contact with the tiles. The gradually curved shape of the tiles above-mentioned presents surfaces of this nature to the waste gas currents, the elliptical tiles illustrated, for example, having convex sides which are presented to the waste gas currents.

The walls 1 are also preferably braced at the top to prevent lateral shifting of one wall as a whole relative to the other. As shown more in detail in Figs. 7 and 8, this lateral bracing at the top is accomplished in the present form of the invention by providing the top tiles with flanges 18, the flanges of adjacent top tiles in the same wall abutting, and also projecting over the waste gas passages 2 on opposite sides of such wall to engage the similar flanges 18 on the top tiles of adjacent walls. In the form illustrated, the abutting flanges 18 are of such shape as to leave openings 19 (Fig. 7) between the same and plates 20 are provided which are supported on the flanges 18, and overlie the openings 19, the plates being of such shape as to form a complete partition between the chamber 21 (Fig. 1) above the hollow walls of the recuperator and the waste gas passages 2 between such walls. In the use of the recuperator the gas to be heated is led into the lower tiles of the walls, as hereinafter described in greater detail, and chamber 21 serves as a gathering chamber for the gas after it has been heated by passing through the various hollow walls. Thus the partitions constituted by plates 20 above-mentioned serve to prevent the waste gases entering the recuperator through ports 6, from passing into the gathering chamber 21.

The several hollow walls 1 are preferably supported upon a plurality of piers 22 (Figs. 1, 9 and 10), such piers being disposed underneath and between the walls 1 in such manner as to provide chambers 23 (Fig. 10) between the piers, and in communication with the upwardly extending passages within the tiles. The air or gas to be heated is led into the chambers 23 from the bottom of the recuperator, suitable doors 24 or the like, indicated conventionally in Fig. 1, being provided to regulate the draft in the several chambers. Preferably the bottom tiles of the hollow walls 1 are so engaged with the piers 22 as to prevent lateral shifting between the walls at their bottoms. In the present form the bottom tiles of the several hollow walls 1 are provided with flanges 25 (Fig. 9) which rest upon shoulders 26 (Fig. 10) on the piers, the flanges 25 of the adjacent bottom tiles in the same hollow wall also engaging to form a partition separating the air entrance chambers 23 from the waste gas passages 2 which are located above the piers.

In some instances, particularly where a recuperator of large capacity is desired, the recuperator may be constructed to reverse the direction of travel of the waste gases therethrough.

If such a recuperator be constructed of tiles requiring bracing between adjacent hollow walls to retain the tiles in proper position, the bracing members obstruct the flow of the waste gases from one level in the recuperator to another, with the result that chambers have been provided outside the confines of the hollow walls to permit the waste gases to flow through such chambers from one level to another. Chambers of the above character, however, reduce the efficiency of the recuperator owing to useless heat radiation from the walls of the said chambers, and unnecessarily increase the space taken up by the recuperator.

In Fig. 11 there is shown a recuperator which may be considered similar to the one shown in Fig. 1, but of large capacity, and with horizontal baffle plates 27 interposed between adjacent hollow walls 1, thus dividing the waste gas passages 2 into a series of horizontal passages at different levels, whereby the direction of motion of the waste gas may be reversed in passing through the recuperator. Since the tiles 9 of the hollow walls 1 are self-sustaining, the baffle plates 27 are not necessary to act as braces between the walls, and thus the partitions formed by the baffle plates may be terminated within the confines of the hollow walls 1 to provide openings 28 and 29, affording communication between the horizontal gas passages which are at different levels. Thus the direction of motion of the gas through the recuperator may be reversed entirely within the limits of the hollow walls. Fig. 6 illustrates the baffle plates 27 as being supported on the shoulders 16 of tiles in adjacent hollow walls, thus providing a partition similar to the one previously described as formed by the plates 20.

Particularly where the recuperator is constructed without the baffle plates 27, as is illustrated in Fig. 1, I prefer to locate the waste gas conduit 5 along the top of the structure at one side thereof, and the exhaust flue 8 along the bottom and at the other side, whereby the waste gases pass more or less gradually through the waste gas passages. Furthermore, the ports 6 preferably are of sufficient length to enable the incoming waste gases to acquire sufficient velocity to carry them well into or across the upper region of the waste gas conduit to insure that the waste gases are properly brought into contact with the different areas of the hollow walls.

While a specific embodiment of the invention has been described, it will be obvious that many changes may be made therein without departing from its principle, as defined in the following claims:

1. A continuous recuperator wall made up of hollow tiles providing upwardly extending passages in such wall adapted to receive gas to be heated, and members interposed between adjacent sides of adjacent tiles making up such wall interlocking to prevent lateral shifting between adjacent tiles.

2. A recuperator wall made up of hollow tiles providing upwardly-extending passages in such wall adapted to receive gas to be heated, adjacent sides of adjacent tiles making up such wall being provided with complementary projections and recesses interlocking to prevent lateral shifting between adjacent tiles.

3. A continuous recuperator wall made up of hollow tiles providing upwardly-extending passages in such wall adapted to receive gas to be heated, members interposed between adjacent sides of adjacent tiles making up such wall interlocking to prevent lateral shifting between adjacent tiles, and means being provided tending to centre the tiles relative to the central plane of the wall.

4. A recuperator wall made up of hollow tiles providing upwardly-extending passages in such wall adapted to receive gas to be heated, adjacent sides of adjacent tiles making up such wall being provided with complementary projections and recesses interlocking to prevent lateral shifting between adjacent tiles, and adjacent surfaces of adjacent tiles located at different levels in such wall being tapered to seat such tiles properly relative to the central plane of the wall.

5. A continuous recuperator wall made up of adjacent vertical columns of hollow tiles, each of such columns providing upwardly-extending passages in such wall adapted to receive gas to be heated, and members interposed between adjacent sides of adjacent columns interlocking to prevent lateral shifting between such columns.

6. A continuous recuperator wall made up of adjacent vertical columns of hollow tiles, each of such columns providing upwardly-extending passages in such wall adapted to receive gas to be heated, members interposed between adjacent sides of adjacent columns interlocking to prevent lateral shifting between such columns, means being provided tending to centre the superposed tiles of the respective columns relative to the central plane of the wall.

7. A continuous recuperator wall made up of adjacent vertical columns of hollow tiles, each of such columns providing upwardly-extending passages in such wall adapted to receive gas to be heated, members interposed between adjacent sides of adjacent columns interlocking to prevent lateral shifting between such columns, the engaging surfaces of superimposed tiles in the respective columns being tapered to centre the tiles properly one over the other.

8. A recuperator wall made up of adjacent vertical columns of hollow tile, each of such columns comprising a plurality of superposed tiles and the tiles of one column overlapping the joints between tiles of an adjacent column.

9. A recuperator wall made up of adjacent vertical columns of hollow tiles, each of such columns being made up of a plurality of superposed tiles, means interlocking the adjacent sides of tiles in adjacent columns to prevent lateral shifting between such tiles, and the tiles of one column overlapping the joints between the tiles of an adjacent column.

10. A recuperator wall made up of adjacent vertical columns of hollow tiles, each of such columns being made up of a plurality of superposed tiles, and certain columns having tiles of heights different from the remaining tiles whereby the joints between the tiles of the columns are overlapped by the tiles of the columns adjacent thereto.

11. A recuperator wall made up of adjacent vertical columns of hollow tiles, each of such columns being made up of a plurality of superposed tiles, means interlocking the adjacent sides of such columns to prevent lateral shifting therebetween, and certain columns having tiles of heights different from the remaining tiles whereby the joints between the tiles of columns are overlapped by the tiles of the columns adjacent thereto.

12. A recuperator tile having an interior passageway extending upwardly therethrough, a projection disposed on one side of such tile, and the opposite side of such tile having a recess complementary to such projection.

13. A recuperator tile having an interior passageway extending upwardly therethrough, a projecting rib disposed along one side of such tile, the opposite side thereof having a pair of shoulders thereon spaced to provide a recess therebetween adapted to receive a rib such as above-mentioned.

14. A recuperator tile having an interior passageway extending upwardly therethrough, a flange disposed adjacent one end of such tile, a projecting rib disposed along one side thereof, the opposite side having a pair of shoulders spaced to provide a recess adapted to receive a rib such as above mentioned, said rib and projecting shoulders being cut away at an intermediate portion of the tile to provide spaces on opposite sides of the tile adapted to receive a flange such as above mentioned.

15. A recuperator comprising continuous parallel walls each made up of hollow tiles providing upwardly extending passageways in such walls adapted to receive gas to be heated, members interposed between adjacent sides of adjacent tiles making up such walls interlocking to prevent lateral shifting between adjacent tiles and bracing members extending between the tops of adjacent walls to oppose relative lateral shifting therebetween.

16. The combination set forth in claim 15 wherein such bracing members are constituted by abutting flanges on the top tiles of adjacent walls.

17. A recuperator comprising parallel walls each made up of hollow tiles providing upwardly extending passages in such walls adapted to receive gas to be heated, top tiles of adjacent walls being provided with abutting flanges adapted to brace the walls against lateral shifting.

18. The combination set forth in claim 17 wherein plates are supported by such flanges to form partitions between the space above the walls and the passages therebetween.

19. A recuperator comprising parallel walls each made up of hollow tiles providing upwardly extending passages in said walls adapted to receive gas to be heated, supporting piers disposed beneath said walls and between the same, said piers being spaced to provide chambers therebetween, the tiles of such walls being of curved annular shape and the bottom tiles thereof resting respectively on the piers which are located on opposite sides thereof, adjacent bottom tiles of each wall being provided with abutting flanges serving to separate the passages between the walls from the chambers between the piers and to brace the tiles against lateral displacement.

20. A recuperator comprising parallel walls each made up of hollow tiles providing upwardly extending passages in said walls adapted to receive gas to be heated and substantially horizontal partitions that are between adjacent walls adapted to form horizontal waste gas passages therebetween at different levels, and means within the confines of such walls for affording communication between adjacent passages whereby the waste gas may travel from one waste gas passage to another within the limits of the hollow walls.

21. A recuperator comprising parallel walls each made up of hollow tiles providing upwardly extending passages in such walls adapted to receive gas to be heated and substantially horizontal baffle plates extending between adjacent walls to form horizontal waste gas passages at different levels in the recuperator, said baffle plates extending only part way across the walls to leave openings within the confines of the walls affording communication between adjacent waste gas passages.

22. The combination set forth in claim 21 wherein interlocking members are provided between adjacent tiles at the portions of the walls adjacent said openings to brace the tiles against lateral shifting.

23. A recuperator comprising parallel walls each made up of hollow tiles providing upwardly extending passages in said walls adapted to receive gas to be heated, said walls being spaced to provide waste gas passages therebetween, the tiles making up such walls having irregular outer side surfaces adapted to break up waste gas currents passing between adjacent walls.

24. A recuperator comprising parallel walls each made up of hollow tiles providing upwardly extending passages in said walls adapted to receive gas to be heated, said walls being spaced to provide waste gas passages therebetween, the tiles making up such walls being of gradually curved annular cross section to present convex surfaces to the gas passing through the waste gas passages between the walls.

25. A recuperator comprising parallel walls each made up of hollow tiles providing upwardly extending passages in said walls adapted to receive gas to be heated, said walls being spaced to provide waste gas passages therebetween, the adjacent sides of adjacent tiles in such walls being provided with interlocking members occupying only a part of the sides of said tiles, in which they are located, to expose the remaining parts of such sides to the waste gases.

In testimony that I claim the foregoing, I have hereunto set my hand this 14th day of April, 1922.

WILLIAM B. CHAPMAN.